INVENTORS.
LANCE E. RIGGIN,
DONALD R. WILLIS and
WALTER L. WUSTER
BY
H. H. Losche
Attorney.

INVENTORS.
LANCE E. RIGGIN,
DONALD R. WILLIS and
WALTER L. WUSTER
H. H. Losche
Attorney INVENTORS.
LANCE E. RIGGIN,
DONALD R. WILLIS and
WALTER L. WUSTER
BY H. H. Fosche
Attorney United States Patent Office 3,487,167

Patented Dec. 30, 1969

3,487,167

TIME GATED SYNC SEPARATOR FOR TELEVISION SYNCHRONIZING WAVEFORM

Lance E. Riggin, Indianapolis, Donald R. Willis, Fort Wayne, and Walter L. Wuster, Indianapolis, Ind., assignors to the United States of America as represented by the Secretary of the Navy Filed Feb. 6, 1967, Ser. No. 614,784

Int. Cl. H041 7/04

U.S. Cl. 178—69.5 7 Claims

ABSTRACT OF THE DISCLOSURE

A solid state circuit having two one-shot multivibrators in series to a vertical sync output gate for producing blanking pulses to close the vertical sync output gate to horizontal sync pulses and to open same for vertical sync pulses and in series to a horizontal sync output gate for gating through the horizontal sync pulses and blanking out vertical sync pulses.

The invention described herein may be manufactured and used by or for the Government of the United States of America for governmental purposes without the payment of any royalties thereon or therefor.

BACKGROUND OF THE INVENTION

This invention is in the field of sync separation for the horizontal and vertical synchronizing pulses for application to the horizontal and vertical generators of a television system to eliminate integration error which causes interlace errors.

Older known means for sync separation used passive resistance-capacitance (RC) networks and alternating current coupled circuits to separate the sync pulses from each other and from the video waveform. These circuits are inherently critical as to peak-to-peak video voltage level and to noise spikes occurring just prior to the arrival of the vertical synchronizing pulse. The vertical RC integrator output inherently has an error due to the difference in horizontal pulse spacing on interlaced fields which contributes a fixed interlace error in addition to random errors due to noise. The presence of the partially separated vertical pulse also has an adverse effect on the horizontal AFC circuit causing jitter in the horizontal sync at the beginning of the two fields in each frame.

SUMMARY OF THE INVENTION

This invention accepts the composite synchronizing pulses following an amplitude separator to eliminate all video signals to pass the composite horizontal (H) and vertical (V) synchronizing pulses. The composite signals are coupled to H and V gates and also to a gate blanking or inhibiting circuit. The gate blanking circuit uses two one-shot multivibrators (MV) in series to produce a blanking voltage for the V sync gate as long as the H sync pulses occur in sequence. After a predetermined time following the H sync pulse sequence, the V gate is opened to receive the V sync pulse. The first H sync pulse for each sequence or field will re-establish the blanking voltage for the V sync output gate. This first H pulse in each field is lost but the remaining H sync pulses are gated through the H sync output gate. It is therefore a general object of this invention to separate the H and V synchronizing pulses from a composite H and V sync pulse input for a television system without error which is normally produced in the vertical scanning interlace.

BRIEF DESCRIPTION OF THE DRAWINGS

These and other objects and the attendant advantages, features and use will become more apparent to those skilled in the art as the description proceeds when considered along with the accompanying drawings, in which.

DESCRIPTION OF THE PREFERRED EMBODIMENTS

Figures 1, 3, 4:
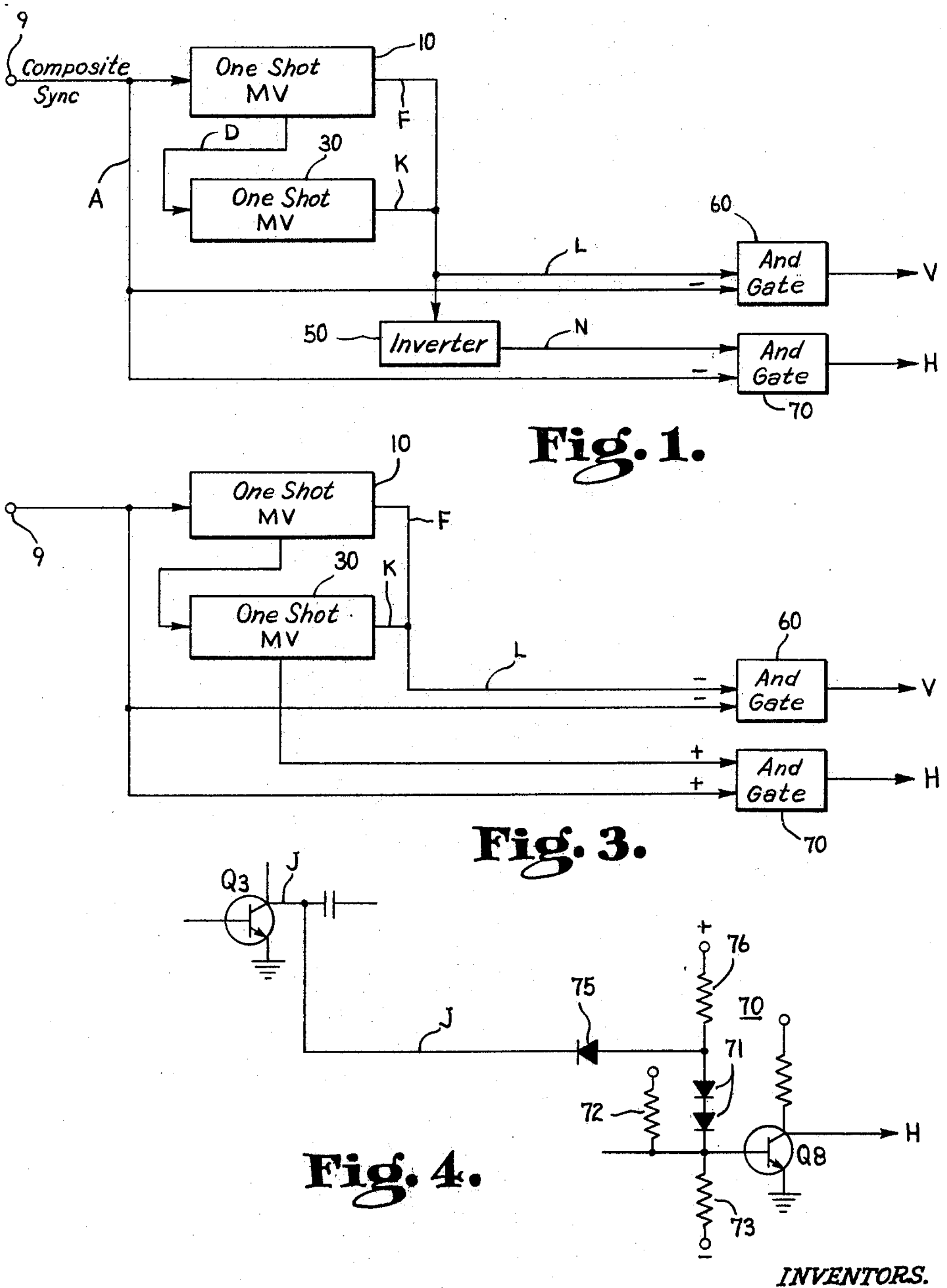
FIGURE 1 is a block circuit diagram of one embodiment of the invention.
FIGURE 3 is a block circuit diagram of a modification of FIGURE 1.
FIGURE 4 is a partial circuit schematic of FIGURE 2 showing the circuit modifications of FIGURE 2 producing the modified embodiment of FIGURE 3.

Referring more particularly to FIGURE 1 there is shown a terminal 9 to which the composite H and V synchronizing pulses are applied after the separation therefrom of all video signals. The composite synchronizing H and V pulses are applied in common to a one-shot MV 10 and AND gate 60 for the V output, and the AND gate 70 for the H output. The one-shot MV 10 has an output D to a second one shot MV 30 producing an output K which is combined with output F of the one-shot MV 10 to produce the output L to the AND gate 60 as the second input thereto. The output K from the one-shot MV 30 is also applied to an inverter 50 producing an inverted output N applied as the second input to AND gate 70. The composite H and V signals on the input terminal 9 are represented as the A input being negative composite signals thereby applying negative input signals to the AND gates 60 and 70. The one-shot MV's 10 and 30 generate inhibiting pulses from the composite signals applied to AND gates 60 and 70 to pass only V output pulses from the gate 60 and H output pulses from AND gate 70, as will become clear in the description of FIGURE 2.

Figure 2:
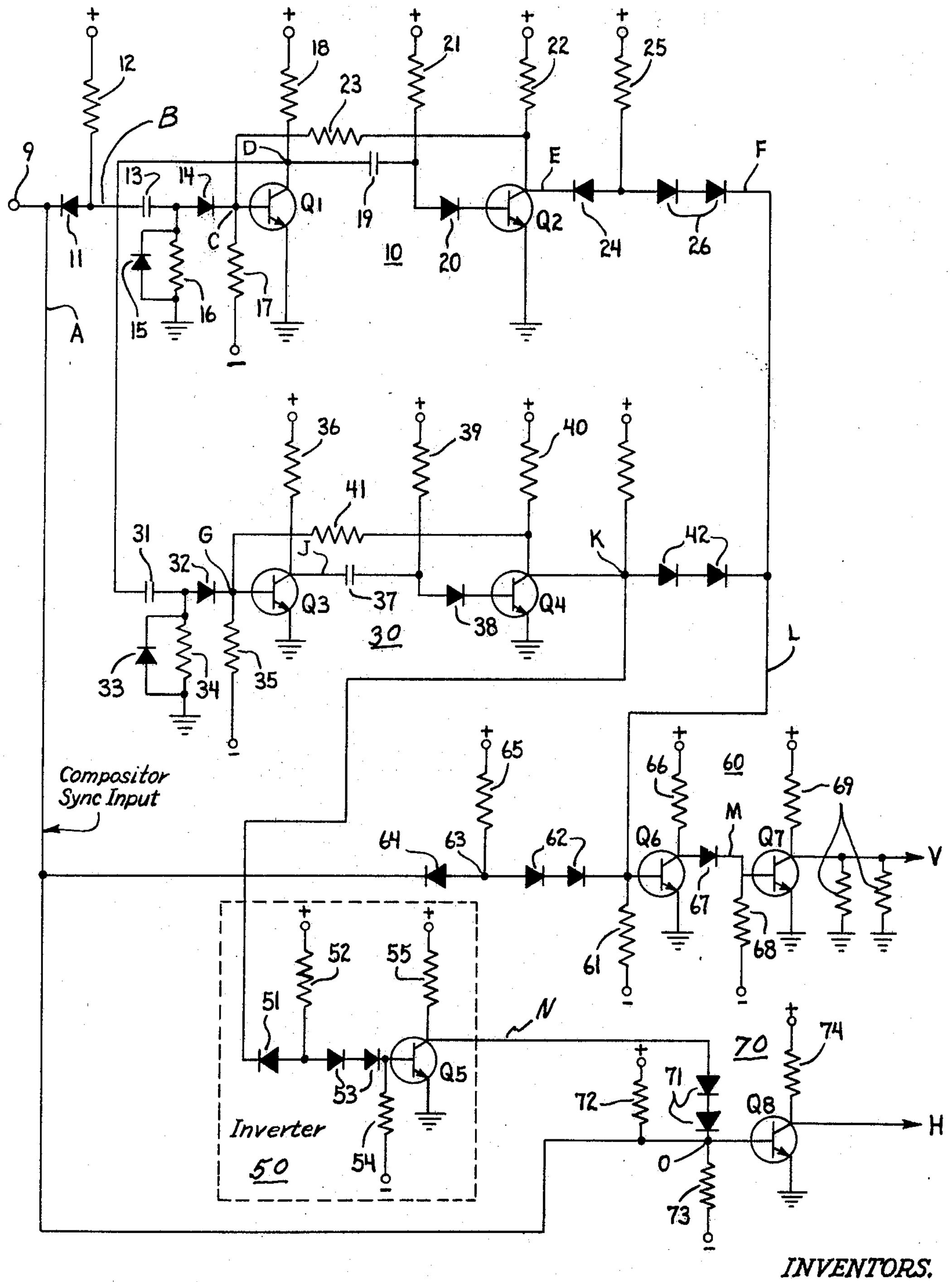
FIGURE 2 is a circuit schematic drawing of the block circuit shown in FIGURE 1.

Referring more particularly to FIGURE 2, terminal 9, to which is applied the composite V an H signals A, is coupled to the cathode of diode 11, the anode of which diode is biased from a positive voltage source through a resistor 12. The anode output B of diode 11 is coupled to one plate of a capacitor 13, the opposite plate of which is coupled to the anode of a diode 14, the cathode of the latter of which is coupled to the base of a transistor Q1. The anode of the diode 14 is also coupled through a parallel circuit of a diode 15 and a resistor 16 to a fixed potential, such as ground. The base terminal C of transistor Q1 is biased from a negative voltage source through a biasing resistor 17. The collector-emitter voltage circuit is from a positive voltage source through a collector load resistor 18 to ground coupled to the emitter of Q1. The collector output, identified by D, is through a coupling capacitor 19 to the anode of a diode 20, the cathode of which is directly coupled to the base of a transistor Q2. The anode of diode 20 is biased from a positive voltage source through a resistor 21. The collector-emitted circuit of transistor Q2 is from a positive voltage source through a collector load resistor 22 to ground coupled to the emitter. The collector output, identified by the letter E, is coupled through a feedback resistor 23 to the base terminal C of transistor Q1 to produce a one-shot MV circuit with a delay therein in accordance with the recovery time of the RC network 19, 21. The output E is also coupled to the cathode of a diode 24, the anode of which is biased from a positive voltage source through a resistor 25. The anode of diode 24 is also coupled in series through a pair of diodes 26 oriented with the anodes in back-to-back relation with respect to the diode 24 to produce on the cathode of the second in series the output F. The one-shot MV 10 produces an inhibiting pulse of a time interval shorter than consecutive H pulses, but longer than one-half adjacent H pulses.

The output D of transistor Q1 is also coupled through a coupling capacitor 31 to the anode of a diode 32, the cathode of which diode is directly coupled to the base terminal G of a transistor Q3 in the one-shot MV 30. The anode of the diode 32 is coupled through a parallel circuit of a diode 33 and a resistor 34 to ground, the diode 33 being oriented with its anode coupled to the ground terminal and its cathode coupled to the anode terminal of diode 32. The base of transistor Q3 is biased from a negative voltage source through a biasing resistor 35 and its collector and emitter are coupled in a voltage circuit through a collector load resistor 36. The one-shot MV 30 circuit is quite similar to that of the MV circuit 30 with the collector output J of transistor Q3 being coupled through a coupling capacitor 37 and a diode 38 to the base of transistor Q4. The anode of the diode 38 is biased through a resistor 39 from a positive voltage source and the collector of transistor Q4 is loaded through a resistor 40 from a positive voltage source, the emitter of Q4 being grounded. The collector of transistor Q4 is coupled to the base terminal G of transistor Q3 through a feedback resistor 41. The output taken from the collector of transistor Q4 is identified by the letter K which is coupled through a pair of diodes 42 to the common output L with the anodes oriented in the direction of the collector and the cathodes oriented in the direction of the common output L. The one-shot MV 30 produces a delayed pulse which is shorter in time than corresponding H pulses applied to terminal 9 which pulse together with the delay or inhibit pulse of the one-shot MV 10 are of a greater time interval than consecutive H pulses, as will later become clear in the description with reference to FIGURE 5.

The output K from the one-shot MV 30 is coupled to an inverter circuit 50, this coupling being to the cathode of a diode 51, the anode of which is biased from a positive voltage source through a biasing resistor 52. The anode of 51 is also coupled to the anode of a pair of diodes 53 in series to the base of an inverter transistor Q5, the base of which is biased from a negative voltage source through a biasing resistor 54. A collector and emitter circuit is from a positive voltage source through a collector load resistor 55 to ground coupled to the emitter thereof. The collector output identified by the letter N is coupled to the H AND gate 70 through a pair of diodes 71 in series oriented with the anode of the first coupled to the collector of Q5 and the cathode of the last coupled to the base terminal 0 of a transistor Q8. The base terminal 0 of transistor Q8 is coupled to a voltage divider circuit divided by the resistors 72 and 73. The base terminal 0 is also coupled to the terminal 9 to receive the composite H and V synchronizing pulses A, as hereinbefore described for FIGURE 1. Transistor Q8 has its collector and emitter in a voltage circuit from a positive voltage source through a collector load resistor 74 to ground coupled to the emitter thereof. This collector provides the H output for the horizontal synchronizing pulses.

The common output L of the two one-shot MV's 10 and 30 is coupled directly to the base of a transistor Q6 in the V AND gate circuit 60. The base of transistor Q6 is biased from a negative voltage source by biasing resistor 61 and is also coupled through a pair of diodes 62 in series to a terminal 63, this terminal being coupled through a diode 64 to terminal 9 to receive the H and V synchronizing pulses A. Terminal 63 is also coupled through a resistor 65 to a positive voltage source. The collector and emitter of transistor Q6 is coupled between a positive voltage source and ground, the positive voltage being coupled to the collector through a load resistor 66. This collector is also coupled to the anode of a diode 67, the cathode of which is coupled directly to the base of a transistor Q7. The base Q7 is biased from a negative voltage source through a biasing resistor 68 while the collector is coupled in a voltage divider network 69, the emitter being coupled directly to ground terminal. The collector of transistor Q7 provides the V output from AND gate 60.

OPERATION OF FIGURES 1 AND 2

Figure 5:
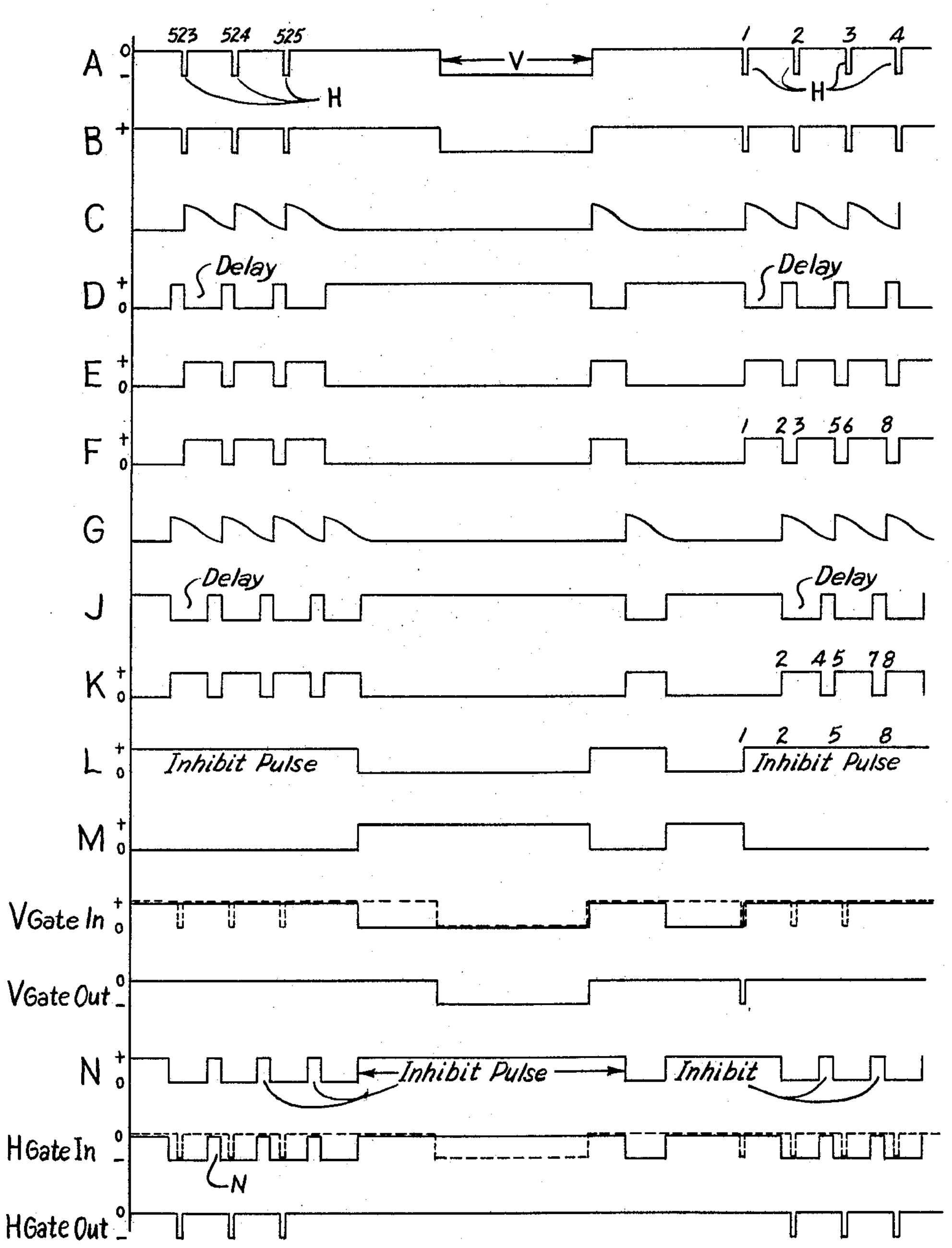
FIGURE 5 illustrates the waveforms at various identified lettered points in the circuits of FIGURES 1 through 4.

In the operation of the device of FIGURES 1 and 2 attention is directed to FIGURE 5 showing the waveforms of the several lettered points in FIGURES 1 and 2, these waveforms all having a uniform amplitude since an understanding of the operation will best be served by avoiding any discussion to the amplitude of the signals for the reason that the circuits are not amplitude dependent for a description of operation. The line A of FIGURE 5 represents the composite input of H and V synchronizing pulses, the last three H pulses identified as 523, 524, and 525 before being blanked out for the V pulse and thereafter the beginning of H pulses 1, 2, 3, and 4 et cetera. These composite pulses are applied through the diode 11 to the one-shot MV 10 to produce at point B the pulses, as shown in line B of FIGURE 5, the only difference from those in A being the voltage bias difference established by the voltage through the resistor 12. The parallel network 15, 16 allows only positive-going pulses through the coupled capacitor 13 to be applied through the anode of diode 14 to the base terminal C, these positive-going pulses being shown in line C of FIGURE 5 wherein this voltage sinks back to its original base bias after a short period of time. The pulse in line C applied to the base of transistor Q1 produces an output voltage waveform D as shown in line D of FIGURE 5 with a delay established as shown in this D line. This delay of the one-shot MV is less than the time interval between H pulses and is applied through the coupling capacitor 19 and diode 20 to the base of transistor Q2 to produce the output waveform E, as shown in line E of FIGURE 5. It may be noted that the leading edge of the V pulse, being negative, does not get to the base terminal C and is thus lost in the waveforms D and E. The collector output E of the transistor Q2 in FIGURE 5 is coupled through the diodes 24 and 26 to produce the F output as shown in the F line of FIGURE 5.

The D output from the one-shot MV 10 is applied to the one-shot MV 30 and, since the G terminal in MV 30 corresponds to the C terminal in MV 10, the positive-going voltage waveform of D will produce a positive-going pulse at terminal G which G terminal voltage will drop back to its original voltage after each positive-going pulse. The positive-going pulses from the G line on the base of transistor Q3 will produce the J line output, as shown in FIGURE 5, with delays between pulses, each delay being of a time interval less than a time interval between H pulses in the A line. The J waveform applied through the coupling capacitor 37 and diode 38 on the base of transistor Q4 will produce a collector output as shown by the line K in FIGURE 5. The combination of the outputs F and K will produce the inhibit pulses as shown in line L of FIGURE 5 on the conductor L to the AND gate 60. Each inhibit pulse L will extend over the full length of all the H pulses of line A since the positive portions of pulses F and K overlap for a time interval greater than consecutive H pulses, as shown by points 1 through 8 on the F, K, and L lines. Following the last H pulse (525) the delay times of MV's 10 and 30 are exceeded and the inhibit pulse ceases. This L inhibit waveform is inverted by the transistor Q6 on the base terminal M of Q7 as shown in line M of FIGURE 5. Since the A waveforms of both H and V are also applied to this gate, the V gate input is shown with both the L and A waveforms in the "V gate in" in FIGURE 5. The "V gate out" as shown in this line of FIGURE 5 will inhibit all of the H pulses entering from the A line but, since the L inhibit pulse is not present during the V pulse, this V pulse will be conducted through the AND gate 60. Since the first H pulse is operative to start the inhibiting pulse, this H pulse is conducted through the vertical AND gate but is lost to the horizontal AND gate, as may be determined from the "V gate in" line in FIGURE 5. It may be seen that the inhibiting pulse L is rising very shortly after the application of the H pulse from the A line which produce this "lost H" in the "V gate out" line. Accordingly, only the V synchronizing pulses will pass through the V gate, except for the first "lost H" pulse following shortly thereafter.

As may be noted in FIGURE 2 the K output of the MV 30 is applied to the inverter circuit 50 which produces the N line output of FIGURE 5. The inhibit pulses in the N line of FIGURE 5 are identified showing a plurality of short inhibit pulses and two substantially long inhibit pulses which are applied to the "H gate in" together with the A line pulses as shown in the "H gate in" line of FIGURE 5. Since the short inhibit pulses of line N are out of phase with the H pulses coming by way of line A, the H pulses will be gated through the AND gate 70. Also, since the inhibit pulse of greatest time interval overlies the synchronizing pulse V coming in over the A line, this V pulse is inhibited from passing through the AND gate 70. The second longest inhibit pulse of line N overlies the first H pulse coming by way of line A and is thus lost to the H output of AND gate 70. Beginning with the second H pulse and those thereafter the inhibiting pulses are out of phase, as shown for the first three pulses in this line, and consequently only H synchronizing pulses H will be gated through AND gate 70 with the exception of the first H pulse following each V synchronous pulse. Since the appearance of the "lost H" pulse in the vertical output and the loss of this one pulse in the horizontal output do not produce any damaging results in the generation of H and V pulses to which these outputs are connected, the loss of this one H pulse is of little consequence. Accordingly, the circuit of FIGURES 1 and 2 provide complete separation of the V and H pulses for driving the vertical and horizontal voltage generators of a television system.

MODIFICATION OF FIGURES 3 AND 4

Referring more particularly to FIGURE 3, the common output of MV's 10 and 30 are coupled to AND gate 60 in like manner as in FIGURE 1; however, the output of MV 30 to the AND gate 70 is taken from a different point where it is unnecessary to pass the signal through an inverter 50, as shown in FIGURE 2. Referring now to FIGURE 4, the output J of transistor Q3 in FIGURE 2 is coupled to the cathode of a coupling diode 75, the anode of which is coupled to the anode of the first in the series of diodes 71, the last of which is cathode coupled to the terminal 0. The common terminal of the anode of diode 75 and the anode of the first in the series of diodes 71 is coupled to a positive voltage source through a resistor 76. In this manner the pulses as shown in the J line of FIGURE 5 are applied to the AND gate 70 to produce substantially the same results as the N line of FIGURE 2 since, as may be seen in FIGURE 5, the N line and J line are substantially the same voltage waveform. Accordingly, the operation of FIGURES 3 and 4 will provide the same results as FIGURES 1 and 2 and accordingly, no description of operation will be given for this modified version of FIGURES 1 and 2.

While many modifications and changes may be made in the constructional details and features of this invention through the use of equivalent circuits and networks to provide the same results and functions, it is to be understood that we desire to be limited in the spirit of our invention only by the scope of the appended claims.

We claim:

1. A time-gated synchronizing horizontal and vertical pulse separator circuit comprising:

an input of composite horizontal and vertical synchronizing pulses;

a first one-shot multivibrator having an input coupled to said input of synchronizing pulses and having first and second outputs;

a second one-shot multivibrator having one input coupled to said first output of said first one-shot multivibrator and having first and second outputs;

two AND gates, each having one input coupled in parallel to said input of said synchronizing pulses, one AND gate having a second input coupled in common to said second outputs of said first and second one-shot multivibrators and having an output, and the other AND gate having a second input coupled to said first output of said second one-shot multivibrator and having an output whereby said second output of said first and second one-shot multivibrators conduct horizontal inhibiting pulses to said one AND gate to gate through vertical synchronizing pulses only and said first output of said second one-shot multivibrator conducts vertical inhibiting pulses to said other AND gate to gate through horizontal synchronizing pulses only.

2. A time-gated synchronizing horizontal and vertical pulse separator circuit as set forth in claim 1 wherein said one-shot multivibrators each includes a pair of semiconductors in a voltage supply and bias circuit to produce a delay prior to return to the stable state of a time interval shorter than the time interval between horizontal synchronizing pulses whereby said second one-shot multivibrator coupled to said first output of said first one-shot multivibrator produces a delay pulse in series with the delay pulse of said first multivibrator on the combined second output to said first AND circuit providing said horizontal pulse inhibiting pulse and said first output of said second one-shot multivibrator provides vertical inhibiting pulses.

3. A time-gated synchronizing horizontal and vertical pulse separator circuit as set forth in claim 2 wherein said first output of said second one-shot multivibrator is separated from said second output by a pair of diodes in series and said first output is coupled to said other AND gate through an inverter.

4. A time-gated synchronizing horizontal and vertical pulse separator circuit as set forth in claim 2 wherein said first output of said second one-shot multivibrator is taken from the output of said first semiconductor of said pair of semiconductors, said first output being coupled through a diode to said other AND gate.

5. A time-gated synchronizing horizontal and vertical pulse separator circuit as set forth in claim 1 wherein said first and second one-shot multivibrators each include first and second transistors in a voltage supply biasing and timing circuit constructed and arranged to produce a pulse output on said first and second outputs for a time interval exceeding the half, but less than the whole, time interval between horizontal synchronizing pulses, the output pulse at said first output being inverted with respect to the output pulse of said second output, and said second one-shot multivibrator having said one input coupled to said first output of said first one-shot multivibrator being said first transistor output of said first one-shot multivibrator coupled to the base control electrode of said first transistor of said second one-shot multivibrator thereby producing first and second outputs delayed in time with respect to the outputs of said first one-shot multivibrator, said multivibrator outputs constituting inhibiting pulses for said one and other AND gates.

6. A time-gated synchronizing horizontal and vertical pulse separator circuit as set forth in claim 5 wherein said AND gates are each transistor gates with the synchronizing pulse input coupled through diodes to the base of said transistor of said one AND gate and directly to the base of said transistor of said other AND gate, and the common output of said first and second one-shot multivibrators being coupled directly to the base of said transistor of said one AND gate and said first output of said second one-shot multivibrator being coupled through diodes to the base of said transistor in said other AND gate.

7. A time gated synchronizing horizontal and vertical pulse separator circuit as set forth in claim 6 wherein said diodes in said couplings to said one and other AND gates are oriented to conduct positive going pulses.

References Cited

UNITED STATES PATENTS

| | | |
|---|---|---|
| 2,853,550 | 9/1958 | Reid. |
| 3,383,463 | 5/1968 | Goodell et al. |

RICHARD MURRAY, Primary Examiner

U.S. Cl. X.R.

178—7.3